US012781399B2

(12) United States Patent
Coupe et al.

(10) Patent No.: US 12,781,399 B2
(45) Date of Patent: Nov. 3, 2026

(54) FIBROUS TEXTURE FOR A THIN-EDGED COMPOSITE BLADE

(71) Applicant: SAFRAN, Paris (FR)

(72) Inventors: Dominique Marie Christian Coupe, Moissy-Cramayel (FR); Marc-Antoine Colot, Moissy-Cramayel (FR)

(73) Assignee: SAFRAN, Paris (FR)

( * ) Notice: Subject to any disclaimer, the term of this patent is extended or adjusted under 35 U.S.C. 154(b) by 37 days.

(21) Appl. No.: 18/546,902

(22) PCT Filed: Mar. 1, 2022

(86) PCT No.: PCT/FR2022/050365
§ 371 (c)(1),
(2) Date: Aug. 17, 2023

(87) PCT Pub. No.: WO2022/185007
PCT Pub. Date: Sep. 9, 2022

(65) Prior Publication Data

US 2024/0133086 A1 Apr. 25, 2024
US 2024/0229308 A9 Jul. 11, 2024

(30) Foreign Application Priority Data

Mar. 3, 2021 (FR) ....................................... 2102044

(51) Int. Cl.
*D03D 25/00* (2006.01)
*B29C 70/24* (2006.01)
(Continued)

(52) U.S. Cl.
CPC ........... *D03D 25/005* (2013.01); *B29C 70/24* (2013.01); *F01D 5/282* (2013.01);
(Continued)

(58) Field of Classification Search
CPC .. F01D 5/282; F01D 5/284; F05D 2300/6012; F05D 2300/603;
(Continued)

(56) References Cited

U.S. PATENT DOCUMENTS 7,101,154 B2 9/2006 Dambrine et al.
7,241,112 B2 7/2007 Dambrine et al.
(Continued)

FOREIGN PATENT DOCUMENTS

FR 3 087 701 A1 5/2020
WO WO 2010/061140 A1 6/2010
WO WO-2020/089344 A1 * 5/2020

OTHER PUBLICATIONS

English machine translation of FR 3087701A1, Nov. 23, 2024.*
(Continued)

*Primary Examiner* — Nathaniel E Wiehe
(74) *Attorney, Agent, or Firm* — CUSHMAN PARTNERS LLC

(57) ABSTRACT

A fibrous texture for a blade has a three-dimensional weave between a first plurality of yarn layers and a second plurality of yarn layers, includes a blade aerofoil part extending between a first edge and a second edge. The texture includes a first part with at least three yarn layers of the first plurality of yarns and at least three yarn layers of the second plurality of yarns. Yarns of the two yarn layers of the first plurality of yarns bind yarns of the second plurality of yarns to the two yarn layers of the second plurality of yarns with a determined binding frequency.

12 Claims, 5 Drawing Sheets

(51) Int. Cl.
*B29L 31/08* (2006.01)
*F01D 5/28* (2006.01)

(52) U.S. Cl.
CPC ..... *B29L 2031/082* (2013.01); *D10B 2505/02* (2013.01); *F05D 2300/6033* (2013.01); *F05D 2300/6034* (2013.01)

(58) Field of Classification Search
CPC ..... F05D 2300/6033; F05D 2300/6034; B29C 70/222; B29C 70/24; B29D 99/0025; D03D 25/005
See application file for complete search history.

(56) References Cited

U.S. PATENT DOCUMENTS

| | | | | |
|---|---|---|---|---|
| 2005/0084377 | A1 | 4/2005 | Dambrine et al. | |
| 2014/0369847 | A1* | 12/2014 | Dambrine | F01D 5/147 139/384 R |
| 2015/0226071 | A1 | 8/2015 | Marshall et al. | |
| 2021/0396142 | A1* | 12/2021 | De Gaillard | F01D 21/045 |

OTHER PUBLICATIONS

English machine translation of WO-2020/089344-A1, Jun. 12, 2025.*
International Search Report as issued in International Patent Application No. PCT/FR2022/050365, dated May 20, 2022.

* cited by examiner

[Fig. 1]
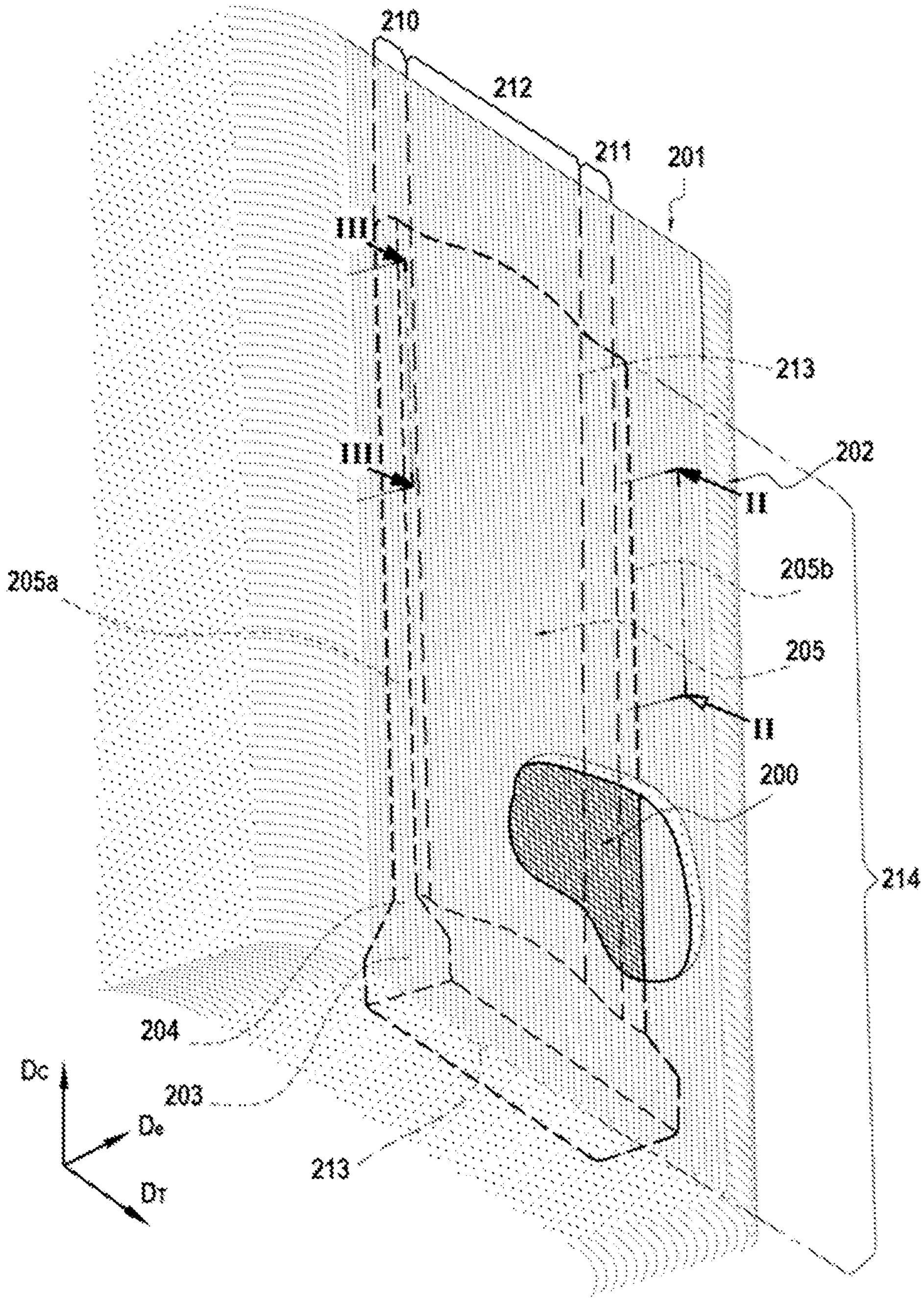

[Fig. 4]
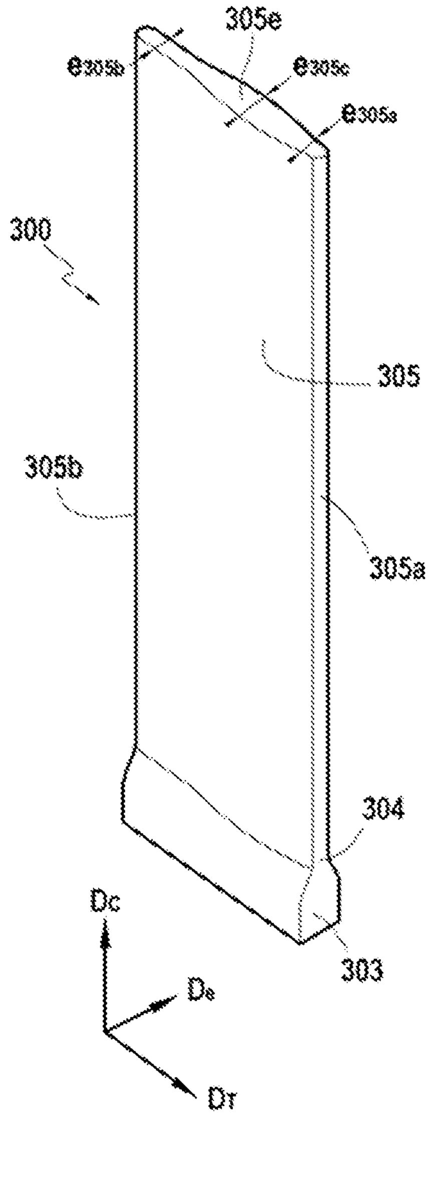

[Fig. 5]
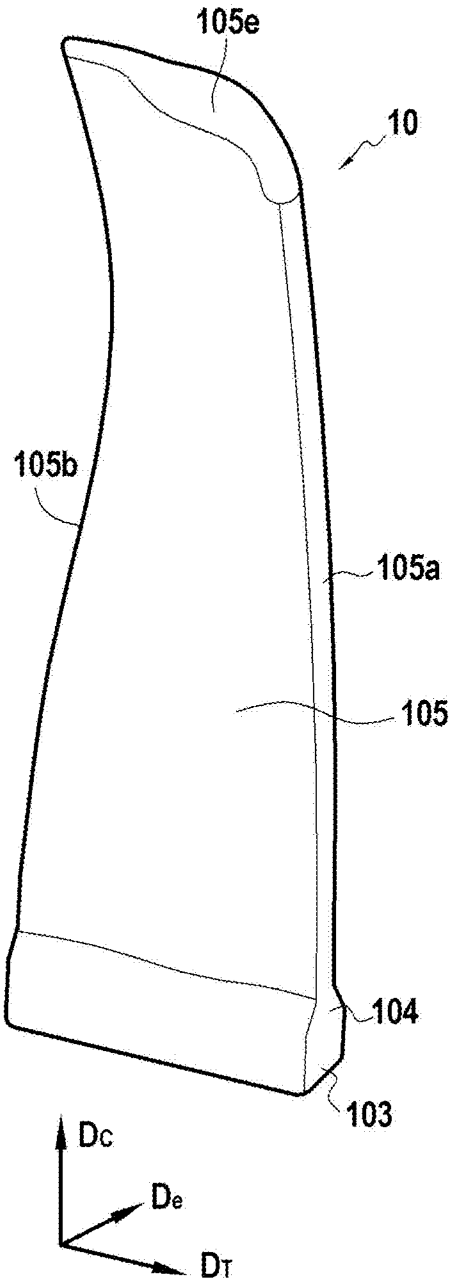

FIBROUS TEXTURE FOR A THIN-EDGED COMPOSITE BLADE

CROSS-REFERENCE TO RELATED APPLICATIONS

This application is the U.S. National Stage of PCT/FR2022/050365, filed Mar. 1, 2022, which in turn claims priority to French patent application number 2102044 filed Mar. 3, 2021.

TECHNICAL FIELD

The present invention relates to the general field of manufacture of blades made of composite material, having a fibrous reinforcement densified by a matrix, the fibrous reinforcement being obtained by three-dimensional (3D) or multilayer weaving.

PRIOR ART

A target field is that of gas turbine blades for aircraft engines or industrial turbines and, more particularly but not exclusively, fan blades for aircraft engines.

The production of a blade made of composite material obtained from a fibrous reinforcement produced by three-dimensional weaving and densified by a matrix is described, in particular, in document US 2005/0084377.

Three-dimensional (3D) or multilayer weaving gives the resulting blade made of composite material a very good mechanical strength.

Optimising the performance of aircraft engines requires blades made of composite material having increasingly thin edges, in order to meet the new aerodynamic requirements.

However, the weaves from 3D or multilayer weaving used to date to form blades made of composite material do not allow very thin leading and/or trailing blade edges to be formed. Indeed, in order to ensure good mechanical strength in the thin parts of the blade, the weaves from 3D or multilayer weaving use at least three weft layers bound together by at least three warp layers.

However, there is a need for blades made of composite material having very thin leading and/or trailing edges, and also having very good mechanical properties at these edges.

DISCLOSURE OF THE INVENTION

For this purpose, the invention proposes a fibrous texture intended to form the fibrous reinforcement of a turbomachine blade made of composite material comprising a fibrous reinforcement densified by a matrix, the texture being in a single piece and having a three-dimensional or multilayer weave between a first plurality of layers of yarns or strands extending in a longitudinal direction and a second plurality of layers of yarns or strands extending in a transverse direction, the texture comprising a blade aerofoil part extending in the transverse direction between a first edge corresponding to a leading edge of the blade and a second edge corresponding to a trailing edge of the blade, said texture comprising a first part with at least three yarn layers of the first plurality of yarns and at least three yarn layers of the second plurality of yarns, characterised in that it further comprises at least one second part present at the first or second edge of the blade aerofoil part of the fibrous texture, the second part including only two yarn layers of the first plurality of yarns and two yarn layers of the second plurality of yarns, yarns of the two yarn layers of the first plurality of yarns binding yarns of the second plurality of yarns to the two yarn layers of the second plurality of yarns with a determined binding frequency.

The fibrous texture of the invention makes it possible to attain a minimum thickness in all or part of the edge or edges while retaining sufficient mechanical properties to ensure good mechanical strength of the leading and trailing edges of the final blade.

According to a particular feature of the fibrous texture of the invention, it comprises a second part present at the first edge of the blade aerofoil part of the fibrous texture, the second part including only two yarn layers of the first plurality of yarns and two yarn layers of the second plurality of yarns, yarns of the two yarn layers of the first plurality of yarns binding yarns of the second plurality of yarns to the two yarn layers of the second plurality of yarns with a first determined binding frequency and a third part present at the second edge of the blade aerofoil part of the fibrous texture, the third part including only two yarn layers of the first plurality of yarns and two yarn layers of the second plurality of yarns, yarns of the two yarn layers of the first plurality of yarns binding yarns of the second plurality of yarns to the two yarn layers of the second plurality of yarns with a second binding frequency, the second part having a first yarn density of the second plurality of yarns and the third part having a second yarn density of the second plurality of yarns greater than the first density, the first binding frequency in the second part being greater than the second binding frequency in the second zone.

This makes it possible to adjust the type of weaving in the parts comprising only two yarn layers depending on the yarn density of the second plurality of yarns in such a way as to avoid having weaving that is too loose or too tight in these parts. The fibrous texture has very thin parts which have a good capacity to deform, in other words these parts are capable of supporting large deformations during the shaping of the texture while maintaining their integrity and, consequently, their reinforcement function.

In a particular embodiment of the fibrous texture, each yarn of the first plurality of yarns binds yarns of the second plurality of yarns according to a multi-layer plain weave in the second part and according to a multi-satin weave in the third part.

According to another particular feature of the fibrous texture of the invention, the second part comprises a first zone having a first yarn density of the second plurality of yarns, and a second zone having a second yarn density of the second plurality, greater than the first density, the binding frequency in the first zone being greater than the binding frequency in the second zone. This makes it possible to adjust the type of weaving in a given part of the texture comprising only two weft yarn layers, in other words in a given edge, when the yarn density of the second plurality of yarns varies significantly.

In a particular embodiment of the fibrous texture, each yarn of the first plurality of yarns binds yarns of the second plurality of yarns according to a multi-layer plain weave in the first zone and according to a multi-satin weave in the second zone.

Another object of the invention is a blade made of composite material comprising a fibrous reinforcement densified by a matrix, the blade extending in a longitudinal direction between a root portion or lower portion and a blade tip or upper portion and, in a transverse direction between a leading edge and a trailing edge, characterised in that the fibrous reinforcement of the blade body is formed by a fibrous texture according to the invention.

Another object of the invention is a method for weaving a fibrous structure intended to form the fibrous reinforcement of a blade made of composite material comprising a fibrous reinforcement densified by a matrix, the fibrous structure being woven in a single piece by three-dimensional or multilayer weaving between a first plurality of layers of yarns or strands extending in a longitudinal direction and a second plurality of layers of yarns or strands extending in a transverse direction, the texture comprising a blade aerofoil part extending in the transverse direction between a first edge corresponding to a leading edge of the blade and a second edge corresponding to a trailing edge of the blade, the method comprising the weaving of a first part with at least three yarn layers of the first plurality of yarns and at least three yarn layers of the second plurality of yarns, characterised in that it further comprises the weaving of at least one second part present at the first or second edge of the blade aerofoil part of the fibrous texture, the second part including only two yarn layers of the first plurality of yarns and two yarn layers of the second plurality of yarns, yarns of the two yarn layers of the first plurality of yarns binding yarns of the second plurality of yarns to the two yarn layers of the second plurality of yarns with a determined binding frequency.

According to a particular feature of the method of the invention, it comprises weaving a second part present at the first edge of the blade aerofoil part of the fibrous texture, the second part including only two yarn layers of the first plurality of yarns and two yarn layers of the second plurality of yarns, yarns of the two yarn layers of the first plurality of yarns binding yarns of the second plurality of yarns to the two yarn layers of the second plurality of yarns with a first determined binding frequency and the weaving of a third part present at the second edge of the blade aerofoil part of the fibrous texture, the third part including only two yarn layers of the first plurality of yarns and two yarn layers of the second plurality of yarns, yarns of the two yarn layers of the first plurality of yarns binding yarns of the second plurality of yarns to the two yarn layers of the second plurality of yarns with a second binding frequency, the second part having a first yarn density of the second plurality of yarns and the third part having a second yarn density of the second plurality of yarns greater than the first density, the first binding frequency in the second part being greater than the second binding frequency in the second zone.

In a particular exemplary embodiment of the method, each yarn of the first plurality of yarns binds yarns of the second plurality of yarns according to a multi-layer plain weave in the second part and according to a multi-satin weave in the third part.

According to another particular feature of the method of the invention, the second part comprises a first zone having a first yarn density of the second plurality of yarns and a second zone having a second yarn density of the second plurality greater than the first density, the binding frequency in the first zone being greater than the binding frequency in the second zone.

In a particular exemplary embodiment of the method, each yarn of the first plurality of yarns binds yarns of the second plurality of yarns according to a multi-layer plain weave in the first zone and according to a multi-satin weave in the second zone.

The present invention also relates to a method for manufacturing a blade made of composite material comprising the following steps:

producing a fibrous structure according to the method for weaving a fibrous structure according to the invention, shaping the fibrous structure in order to form a fibrous preform of the blade to be manufactured, densification of the fibrous preform.

BRIEF DESCRIPTION OF THE FIGURES

FIG. 1 is a schematic view illustrating the three-dimensional weave of a fibrous structure for manufacturing an aircraft engine blade in accordance with an embodiment of the invention, FIG. 4 is a schematic perspective view of a fibrous blade preform coming from the fibrous structure of FIG. 1, FIG. 5 is a schematic perspective view of a blade made of composite 10 material obtained by densification by a matrix of the preform of FIG. 4.

DESCRIPTION OF THE EMBODIMENTS

Figures 2A, 2B, 2C, 2D:
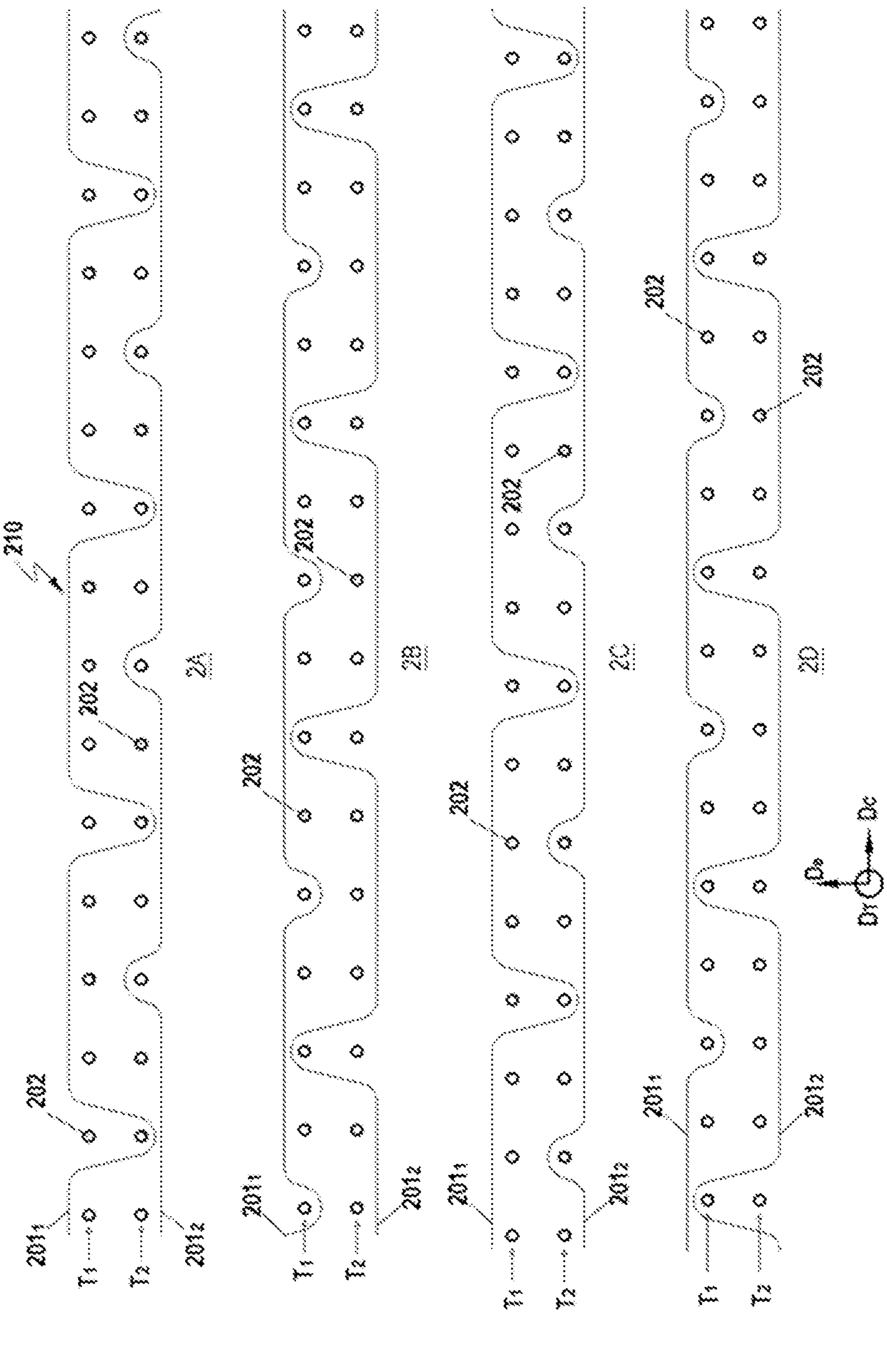
FIGS. 2A to 2D show, along the section III-III in FIG. 1, the various successive types of weaving planes of a portion of the fibrous structure of FIG. 1 intended to form a part of the leading edge of the blade.

The invention relates, in general, to the production of blade bodies or blades made of composite material produced from a fibrous texture obtained by three-dimensional (3D) or multilayer weaving. Non-limiting examples of such blades are, in particular, fan blades, outlet guide vanes (OGV), inlet guide vanes (IGV), variable stator vanes (VSV), etc.

A method for manufacturing a fibrous structure in accordance with the invention is described in relation to the manufacture of a turbomachine fan blade. The fibrous structure of the invention is obtained by three-dimensional weaving or by multilayer weaving.

Here, the term "three-dimensional weaving" or "3D weaving" shall mean a method of weaving by which at least some warp threads bind weft threads over a plurality of weft layers.

Here the term "multilayer weaving" shall mean a 3D weaving with a plurality of weft layers, for which the base weave of each layer is equivalent to a conventional 2D fabric weave, such as a plain, satin or twill weave, but with certain points of the weave which bind the weft layers to one another.

The production of the fibrous structure by 3D or multilayer weaving makes it possible to obtain a bond between the layers, and therefore to have a good mechanical strength of the fibrous structure and of the piece made of composite material obtained, in a single textile operation.

An example of three-dimensional weaving is weaving with interlock weave. The term "weaving with interlock weave" shall mean a type of three-dimensional weaving, in which each warp layer binds a plurality of weft layers, with all the yarns of the same warp column having the same movement in the weave plane.

It may be desirable to use yarns with different chemical natures between different parts of the fibrous structure, in particular between core and skin in order to confer particular properties on the resulting part made of composite material, in particular in terms of resistance to oxidation or wear.

Hence, in the case of a part made of thermostructural composite material with refractory fibre reinforcement, a preform can be used having carbon fibres in the core and ceramic fibres, for example silicon carbide (SiC), at the surface, in order to increase the resistance to wear and to oxidation of the composite part at this part of the surface.

An embodiment of a fibrous structure in accordance with the invention is now described. In this example, the weaving is carried out on a Jacquard loom.

FIG. 1 shows, very schematically, a fibrous structure 200 intended to form the fibrous reinforcement of an aircraft engine blade.

The fibrous structure 200 is obtained by three-dimensional weaving, or 3D weaving, or by multilayer weaving performed in known manner by means of a jacquard loom on which a bundle of warp yarns or strands 201 has been arranged in a plurality of layers, the warp yarns binding weft yarns or strands 202 which are also arranged in a plurality of layers. A detailed exemplary embodiment of a fibrous preform for forming the fibrous reinforcement of a blade for an aircraft engine is described in detail in documents U.S. Pat. Nos. 7,101,154, 7,241,112 and WO 2010/061140.

The fibrous structure 200 is woven in the form of a strip extending generally in a direction $D_C$ corresponding to the direction of the warp yarns 201 and the longitudinal direction of the blade to be produced. The fibrous structure has a thickness in a direction $D_e$ which is variable both in the direction $D_C$ and in a direction $D_T$ perpendicular to the direction $D_C$ and corresponding to the direction of the weft yarns 202. The variations in thickness are determined as a function of the longitudinal thickness and of the profile of the aerofoil of the blade to be produced. In the part intended to form a root preform, the fibrous structure 200 has, in the direction $D_C$, an overthickness part 203 determined as a function of the thickness of the root of the blade to be produced. The fibrous structure 200 extended by a part of decreasing thickness 204 intended to form the shank of the blade, and then by a part 205 intended to form the aerofoil of the blade. The fibrous structure 200 is woven in a single piece and must have, after cutting of the nonwoven yarns, the almost-final shape and dimensions of the blade ("net shape"). For this purpose, in the parts with thickness variations of the fibrous structure, such as in the part with decreasing thickness 204, the thickness reduction of the preform is obtained by progressively removing warp and weft layers during weaving.

In the direction $D_T$, the part 205 has a profile with thickness variable between its edge 205*a* intended to form the leading edge of the blade and its edge 205*b* intended to form the trailing edge of the blade to be produced, an overthickness portion (portion 212 in FIG. 1) being present between the edges 205*a* and 205*b*.

The part 205 includes a first portion 212 constituting the majority of the part 205. The portion 212 is located between a second portion 210 and a third portion 211 corresponding, respectively, to the edges 205*a* and 205*b* of the part 205.

The first portion 212 not needing to be thin, is produced by three-dimensional weaving, between at least three warp yarn layers and at least three weft yarn layers.

In accordance with the invention, the edges 205*a* and 205*b* of the part 205 each have a thickness in the direction $D_e$ significantly less than that of the portion 212 in order to allow the formation of a blade with a very thin leading edge and trailing edge. More precisely, the portions 210 and 211 are woven with only two warp yarn layers and two weft yarn layers, which makes it possible to attain a minimum thickness while maintaining sufficient mechanical properties to ensure a mechanical strength of the leading and trailing edges of the final blade.

Still in accordance with the invention, in the portions 210 and 211, the yarns of the two warp yarn layers bind yarns of the two weft yarn layers with a determined binding frequency in order to adjust the density of weft yarns in the part of the fibrous texture considered. More precisely, if the portion considered has a low weft yarn density which is measured by the number of weft yarns per centimetre and which is manifest by columns of weft yarns spaced further apart, a type of weave is used with a higher binding frequency of the warp yarns in order to avoid a weaving that is too loose and therefore detrimental to the mechanical strength of the final blade. On the other hand, if the portion considered has a high weft yarn density, a type of weave is used with a lower binding frequency of the warp yarns in order to bind the weft yarns. By way of non-limiting example, the weft yarn density is considered to be low when the number of weft yarns in the direction $D_C$ and per weft layer is less than or equal to 3.33 weft yarns per centimetre, while the weft yarn density is considered to be high when the number of weft yarns is greater than 3.33 yarns per centimetre.

In the example described here, the fibrous texture 200 has a higher density of weft yarns in the second portion 210 corresponding to the edge 205*a* of the part 205, than in the third portion 211 corresponding to the edge 205*b* of the part 205. Consequently, the portion 211 is woven with a type of weave having a binding frequency of warp yarns greater than the binding frequency of the type of weave used for weaving the portion 210.

FIGS. 2A to 2D show the various successive planes of a type of weave used in the portion 210 which comprises two weft thread layers T1 and T2. The warp yarns $\mathbf{201}_1$ and $\mathbf{201}_2$ belong respectively to two warp yarn layers. The type of weave corresponds here to a multi-twill weave with a step of 4. The warp yarns $\mathbf{201}_1$ and $\mathbf{201}_2$, shown in FIGS. 2A to 2D, have a low binding frequency due to the high density of weft yarns in the portion 210.

Figure 3A:
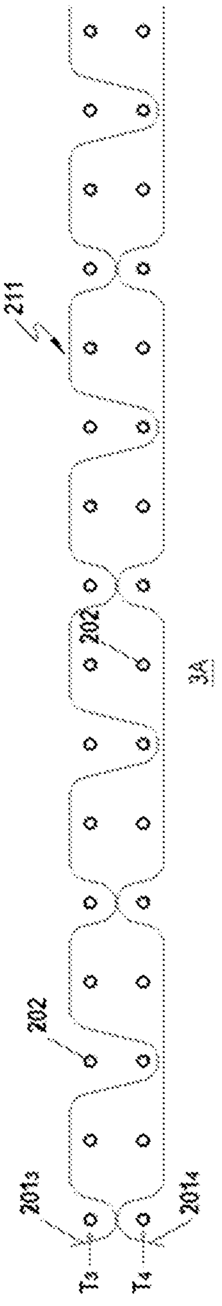
FIGS. 3A to 3D show, along the section II-II in FIG. 1, the various successive types of weaving planes of a portion of 5 the fibrous structure of FIG. 1 intended to form a part of the trailing edge of the blade.
Figure 3B:
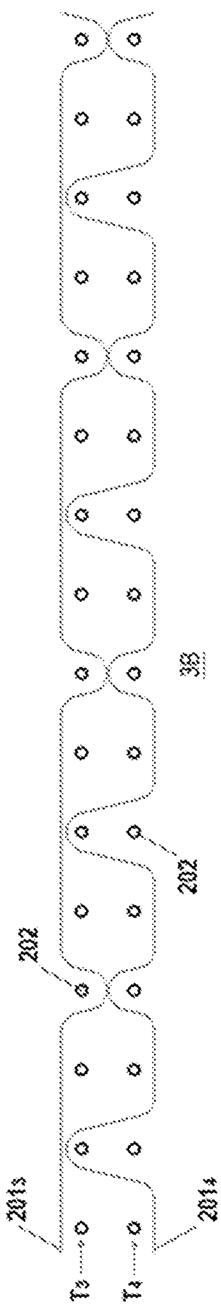
Figure 3C:
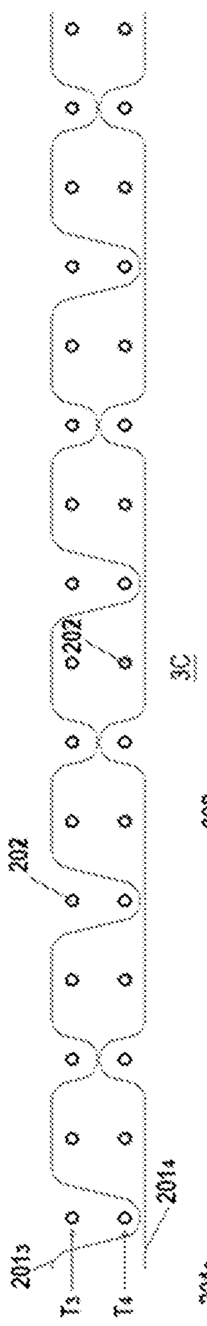
Figure 3D:
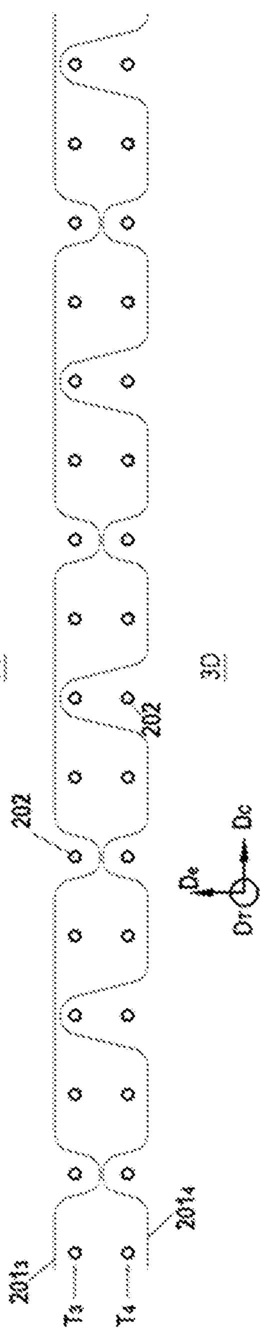

FIGS. 3A to 3D show the various successive planes of a type of weave used in the portion 211 which comprises two weft thread layers T3 and T4. The warp yarns $\mathbf{201}_3$ and $\mathbf{201}_4$ belong respectively to two warp yarn layers. The type of weave corresponds here to an alternation, in other words one weave plane out of two, between a multi-layer plain and a multi-twill weave with a step of 4. The warp yarns $\mathbf{201}_3$ and $\mathbf{201}_4$ shown in FIGS. 3A to 3D have a high binding frequency greater than the binding frequency in the portion 210 due to the lower density of weft yarns in the 30 portion 211.

The types of weaving shown in FIGS. 2A to 2D and 3A to 3D are only examples of weaves having different binding frequencies of warp yarns adjusted to the density of weft yarns. Other types of weaving defined on the basis of a multi-twill weave, a multi-layer plain weave, or a mixture of these two types of weave can be used.

Furthermore, in a given portion of the fibrous texture, such as for example the portion 210 or the portion 211, the weft yarn density can vary, in particular in the direction $D_C$. In this case, a first zone of this portion having a low weft yarn density is woven with a type of weave having a high binding frequency of the warp yarns while a second zone of the same portion having a higher weft yarn density than in the first zone is woven with a type of weave having a binding frequency of the warp yarns less than the binding frequency of the weave in the first zone.

In the example described here, the first portion 212 is woven with an interlock weave between at least three warp yarn layers and three weft yarn layers. The reduction in thickness in the direction $D_e$ of the second and third portions 210, 211 is obtained by progressively removing weft yarns and warp yarns in the first portion 212 in the vicinity of its junction with the second and third portions 210, 211.

Once the weaving of the fibrous structure 200 is achieved, the non-woven yarns are cut at the borders of the structure. The fibrous preform 300 illustrated in FIG. 4 and woven in a single piece is then obtained. The preform 300 includes an overthickness part 303, corresponding to the part 203 of the fibrous structure 200, prolonged by a part 304 with decreasing thickness, corresponding to the part 204 of the fibrous structure 200. The preform 300 also comprises an aerofoil part 305 corresponding to the part 205 of the fibrous structure 200 which extends in direction $D_T$ between a leading-edge part 305*a* and a trailing edge part 205*b* corresponding respectively to the edges 205*a* and 205*b* of the fibrous structure 200. The aerofoil part 305 also has, in direction $D_T$, an overthickness portion 305*e* corresponding to the portion 212 of the fibrous structure 200. The leading-edge part 305*a* and the trailing edge part 305*b* have, in direction $D_e$, thicknesses e305*a* and e305*b* respectively, which are much lower than the thickness e305*c* of the overthickness portion 305*e*.

The fibrous preform 300 is then densified in order to form a blade 10 made of composite material illustrated in FIG. 5. The densification of the fibrous preform intended to form the fibrous reinforcement of the part to be manufactured consists of filling the pores of the preform, in all or part of the volume thereof, with the material constituting the matrix. This densification can be carried out in a manner that is known per se, following the liquid method (CVL) or the gaseous method (CVI), or the method of injecting a ceramic filler (Slurry Cast) or the method of impregnating with a silicon alloy (MI or RMI) or else following a sequence of one or more of these methods.

The liquid method involves impregnating the preform with a liquid composition containing a precursor of the matrix material. The precursor is usually in the form of a polymer, such as a high-performance epoxy resin, optionally diluted in a solvent. The preform is placed in a mould that can be closed in a sealed manner with a recess having the shape of the moulded final blade. The mould is then closed and the matrix precursor liquid (for example a resin) is injected into all of the recesses in order to impregnate all of the fibrous part of the preform.

The transformation of the precursor into matrix, i.e. its polymerisation, is carried out by heat treatment, generally by heating the mould, after removal of any solvent and cross-linking of the polymer, the preform always being kept in the mould having a shape corresponding to that of the part to be produced.

In the case of the formation of a carbon ceramic matrix, the heat treatment consists of pyrolyzing the precursor in order to transform the matrix into a carbon or ceramic matrix depending on the precursor used and the pyrolysis conditions. By way of example, ceramic liquid precursors, in particular SiC or SiCN, can be polycarbosilane (PCS) polytitanocarbosilane (PTCS) or polysilazane (PSZ) resins, whereas carbon liquid precursors can be resins with a relatively high coke content, such as phenolic resins. Several consecutive cycles can be carried out from the impregnation up to the heat treatment, in order to achieve the desired degree of densification.

According to an aspect of the invention, in the case, in particular, of the formation of an organic matrix, the densification of the fibrous preform can be produced by the well-known method of resin transfer moulding (RTM). According to the RTM method, the fibrous preform is placed in a mould having the external shape of the parts of be produced. A thermosetting resin is injected into the internal space of the mould, which comprises the fibrous preform. A pressure gradient is generally established in this inner space between the location where the resin is injected and the orifices for removal thereof, in order to control and optimise the impregnation of the preform by the resin.

The densification of the preform can also be produced by polymer impregnation and pyrolysis (PIP), or by slurry impregnation ("slurry cast"), containing for example SiC and organic binders, followed by an infiltration with liquid silicon ("Melt infiltration").

The densification of the fibrous preform can also be carried out in known manner, by the gaseous method by chemical vapour infiltration (CVI). The fibrous preform corresponding to the fibrous reinforcement of the blade to be produced is placed in a furnace, into which a reactive gaseous phase is admitted. The pressure and temperature prevailing in the furnace and the composition of the gaseous phase are chosen so as to enable the diffusion of the gaseous phase within the pores of the preform in order to form the matrix there by deposition, at the core of the material in contact with the fibres, of a solid material resulting from the decomposition of a constituent of the gaseous phase or from a reaction between several constituents, contrary to the pressure and temperature conditions specific to CVD processes ("Chemical Vapour Deposition") which lead exclusively to a deposit at the surface of the material.

The formation of a SiC matrix can be obtained with methyltrichlorosilane (MTS) giving SiC by decomposition of the MTS, while a carbon matrix can be obtained with hydrocarbon gases such as methane and/or propane providing carbon by cracking.

A densification combining liquid method in gaseous method can also be used in order to facilitate the implementation, limit the costs and the manufacturing cycles, while obtaining satisfactory characteristics for the envisaged use.

The densification methods described above make it possible to produce, from the fibrous structure of the invention, mainly parts made of composite material with organic matrix (CMO), carbon matrix (C/C) and ceramic matrix (CMC).

In the case of the production of a part made of an oxide/oxide composite material, the fibrous structure is impregnated with a slurry charged with refractory oxide particles. After removing the liquid phase of the slurry, the preform thus obtained undergoes a heat treatment in order to sinter the particles and to obtain a refractory oxide matrix. The impregnation of the structure can be carried out with methods showing a pressure gradient, such as injection moulding type methods "RTM" or submicron powder suction methods, termed "APS".

After densification, a blade 10 made of composite material is obtained which, as illustrated in FIG. 5, has a root 103 in its lower part, formed by the overthickness part 303 of the fibrous preform 300, which is prolonged by a shank 104 formed by the part 304 with decreasing thickness of the preform 300 and an aerofoil 105 formed by the aerofoil part 305 of the fibrous preform 300. The aerofoil 105 has a leading edge 105*a* and a trailing edge 105*b*, respectively corresponding to the leading edge 305*a* and trailing edge 305*b* parts of the fibrous preform 300 and an overthickness portion 105*e* corresponding to the overthickness portion 305*e* of the fibrous preform 300. The leading edge 105*a* and the trailing edge 105*b* have a very low thickness because the fibrous reinforcement in these parts of the blade comprises only two weft yarn layers bound together by only two weft yarn layers as previously explained. In addition, the mechanical strength of these very low thickness parts is optimised by adjusting the binding frequency as a function of the weft yarn density.

The fibrous structure and its method of manufacture according to the present invention can be used, in particular, to produce turbomachine blades having a more complex geometry than the blade shown in FIG. 5, such as blades including, in addition to that of FIG. 5, one or more platforms enabling functions to be carried out, such as sealing of the flow path, anti-tilting, etc. The fibrous structure and its method of manufacture according to the present invention can be used, for example, for the manufacture of sectors of blade for gas turbine nozzles or flow-straighteners.

The invention claimed is:

1. A fibrous texture intended to form a reinforcement of a turbomachine blade made of composite material, the fibrous texture comprising:

a fibrous reinforcement densified by a matrix, the fibrous texture being in a single piece and having a three-dimensional or multilayer weave between a first plurality of layers of yarns or strands extending in a longitudinal direction and a second plurality of layers of yarns or strands extending in a transverse direction, a blade aerofoil part extending in the transverse direction between a first edge corresponding to a leading edge of the turbomachine blade and a second edge corresponding to a trailing edge of the turbomachine blade, a first part with at least three yarn or strand layers of the first plurality of yarns or strands and at least three yarn or strand layers of the second plurality of yarns or strands, at least one second part present at the first or second edge of the blade aerofoil part of the fibrous texture, the at least one second part including only two yarn or strand layers of the first plurality of yarns or strands and two yarn or strand layers of the second plurality of yarns or strands, yarns or strands of the two yarn or strand layers of the first plurality of yarns or strands binding yarns or strands of the second plurality of yarns or strands to the two yarn or strand layers of the second plurality of yarns or strands with a first binding frequency.

2. The fibrous texture according to claim 1, wherein the second part is present at the first edge of the blade aerofoil part of the fibrous texture, and wherein the fibrous texture further comprises a third part present at the second edge of the blade aerofoil part of the fibrous texture, the third part including only two yarn or strand layers of the first plurality of yarns or strands and two yarn or strand layers of the second plurality of yarns or strands, yarns or strands of the two yarn or strand layers of the first plurality of yarns or strands binding yarns or strands of the second plurality of yarns or strands to the two yarn or strand layers of the second plurality of yarns or strands with a second binding frequency, the second part having a first yarn or strand density of the second plurality of yarns or strands and the third part having a second yarn or strand density of the second plurality of yarns or strands greater than the first density, the first binding frequency being greater than the second binding frequency.

3. The fibrous texture according to claim 2, wherein each yarn or strand of the first plurality of yarns or strands binds yarns or strands of the second plurality of yarns or strands according to a multi-layer plain weave in the second part and according to a multi-satin weave in the third part.

4. The fibrous texture according to claim 1, wherein said at least one second part comprises a first zone having a first yarn or strand density of the second plurality of yarns or strands, and a second zone having a second yarn or strand density of the second plurality of yarns or strands, greater than the first density, a binding frequency in the first zone being greater than a binding frequency in the second zone.

5. The fibrous texture according to claim 4, wherein each yarn or strand of the first plurality of yarns or strands binds yarns or strands of the second plurality of yarns or strands according to a multi-layer plain weave in the first zone and according to a multi-satin weave in the second zone.

6. The blade made of composite material comprising the fibrous reinforcement densified by the matrix, the blade extending in the longitudinal direction between a root portion or lower portion and a blade tip or upper portion and, in the transverse direction between the leading edge and the trailing edge, wherein the fibrous reinforcement of the blade body is formed by the fibrous texture according to claim 1.

7. A method for weaving a fibrous structure intended to form a reinforcement of a blade made of composite material comprising the fibrous reinforcement densified by a matrix, the fibrous structure being woven in a single piece by three-dimensional or multilayer weaving between a first plurality of layers of yarns or strands extending in a longitudinal direction and a second plurality of layers of yarns or strands extending in a transverse direction, the fibrous structure comprising a blade aerofoil part extending in the transverse direction between a first edge corresponding to a leading edge of the blade and a second edge corresponding to a trailing edge of the blade, the method comprising:

weaving a first part with at least three yarn or strand layers of the first plurality of yarns or strands and at least three yarn layers or strands of the second plurality of yarns or strands, weaving at least one second part present at the first or second edge of the blade aerofoil part of the fibrous structure, the second part including only two yarn or strand layers of the first plurality of yarns or strands and two yarn or strand layers of the second plurality of yarns or strands, yarns or strands of the two yarn layers of the first plurality of yarns or strands binding yarns or strands of the second plurality of yarns or strands to the two yarn or strand layers of the second plurality of yarns or strands with a first binding frequency.

8. The method according to claim 7, wherein the second part is present at the first edge of the blade aerofoil part of the fibrous structure, and the method further comprising weaving a third part present at the second edge of the blade aerofoil part of the fibrous structure, the third part including only two yarn or strand layers of the first plurality of yarns or strands and two yarn or strand layers of the second plurality of yarns or strands, yarns or strands of the two yarn or strand layers of the first plurality of yarns or strands binding yarns or strands of the second plurality of yarns or strands to the two yarn or strand layers of the second plurality of yarns or strands with a second binding frequency, the second part having a first yarn or strand density of the second plurality of yarns or strands and the third part having a second yarn or strand density of the second plurality of yarns or strands greater than the first density, the first binding frequency being greater than the second binding frequency.

9. The method according to claim 8, wherein each yarn or strand of the first plurality of yarns or strands binds yarns or strands of the second plurality of yarns or strands according to a multi-layer plain weave in the second part and according to a multi-satin weave in the third part.

10. The method according to claim 8, wherein said at least one second part comprises a first zone having a first yarn or strand density of the second plurality of yarns or strands and a second zone having a second yarn or strand density of the second plurality of yarns or strands greater than the first density, a binding frequency in the first zone being greater than a binding frequency in the second zone.

11. The method according to claim 10, wherein each yarn or strand of the first plurality of yarns or strands binds yarns or strands of the second plurality of yarns or strands according to a multi-layer plain weave in the first zone and according to a multi-satin weave in the second zone.

12. A method for manufacturing the blade made of composite material comprising:

producing the fibrous structure conforming to the method of weaving the fibrous structure according to claim 7, shaping the fibrous structure in order to form a fibrous preform of the blade to be manufactured, and densifying the fibrous preform.

* * * * *